No. 633,554. Patented Sept. 19, 1899.
W. R. MAGEE.
POULTRY DEVICE.
(Application filed Feb. 10, 1898.)
(No Model.)
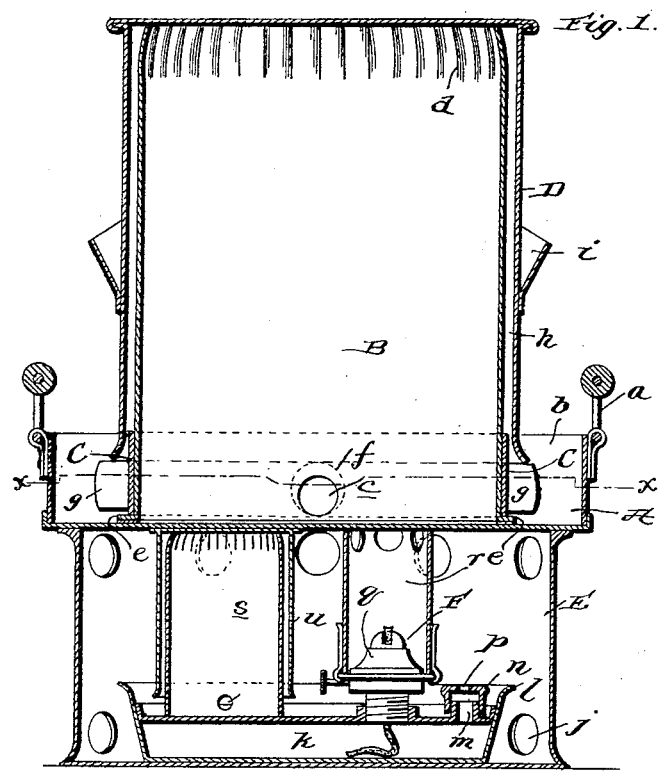
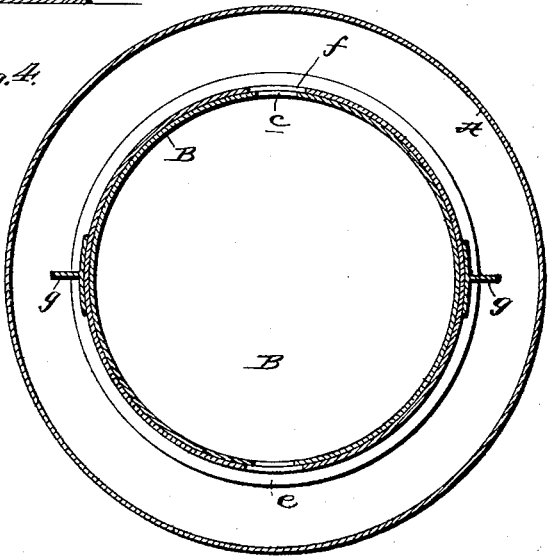
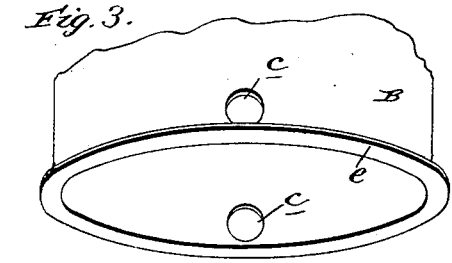
Witnesses:
Inventor
W. R. Magee
By James J. Sheehy
Attorney

UNITED STATES PATENT OFFICE.

WILBER R. MAGEE, OF SIDNEY, OHIO, ASSIGNOR OF ONE-HALF TO ELIAS J. GRIFFIS, OF SAME PLACE.

POULTRY DEVICE.

SPECIFICATION forming part of Letters Patent No. 633,554, dated September 19, 1899.

Application filed February 10, 1898. Serial No. 669,823. (No model.)

*To all whom it may concern:*

Be it known that I, WILBER R. MAGEE, a citizen of the United States, residing at Sidney, in the county of Shelby and State of Ohio, have invented new and useful Improvements in Poultry Watering and Feeding Devices, of which the following is a specification.

My invention relates to devices for supplying poultry with water and feed; and its novelty and many advantages will be fully understood from the following description and claims when taken in conjunction with the annexed drawings, in which—

Figure 1 is a diametrical section of my improved device. Fig. 2 is a horizontal section taken in the plane indicated by the line $x\,x$ of Fig. 1. Fig. 3 is a detail perspective view of the lower portion of the reservoir, and Fig. 4 is a perspective view of the adjustable collar which controls the discharge-openings of the reservoir.

In the said drawings similar letters designate corresponding parts in all of the several views, referring to which—

A designates the pan of my improved device, which is preferably provided with handles $a$ to permit of the device being conveniently moved from place to place, and B designates a reservoir for water or for feed of a fluid nature which is of about the proportional diameter shown, so that when it is placed on and connected to the bottom of the pan a space $b$ will be afforded between it and the side wall of the pan for the poultry to drink from. The said reservoir is provided adjacent to its lower end with one or more apertures $c$ for the passage of water or feed and at its upper end is crimped, as indicated by $d$, for a purpose presently described.

C designates a collar which loosely surrounds the reservoir B and bears on a flange $e$ at the base thereof. This collar is provided with apertures $f$, designed to be registered with the apertures $c$ of the reservoir, and is also provided with finger-pieces $g$, the same being so arranged that when they are opposite the handles $a$ of the pan the apertures $f$ will be coincident with the apertures $c$, as shown in Figs. 1 and 2.

Over the reservoir B is arranged a removable hood D, which is of such a size as to afford a space $h$ between it and the reservoir for the passage of air and is designed to bear on the finger-pieces $g$. While this hood is shown in contact with the upper end of the reservoir, it is obvious that by virtue of the hood bearing on the finger-pieces $g$ air will always be able to find its way from the passage $h$ between the reservoir and hood into said reservoir. It is also obvious that when desired the hood may be of such a height that its top rests slightly above the upper end of the reservoir. The hood is designed when removed from the reservoir to be used as a receptacle to fill said reservoir with water, and it is therefore provided with suitable handles $i$. The water is poured from the hood into the reservoir, after which the hood is placed over the reservoir, as shown. For the purpose of enabling an attendant to readily remove the hood from the reservoir and as readily place said hood over the reservoir the lower end of the hood is flared, as shown, while for the purpose of facilitating the placing of the hood over the reservoir said reservoir has its upper end bent inwardly and crimped, as before described. The lower flared end of the hood D also enables it to clear the collar C when placed in position and rest on the finger-pieces $g$ of said collar.

In using my improved device to supply poultry with water the hood D is removed and the reservoir is filled with water, while its apertures $c$ are closed, after which the hood D is replaced in the position shown in Fig. 1. With the apertures $c$ of the reservoir closed by the collar C the passage of water from the reservoir to the space $b$ will be so retarded as to prevent filling of the said space before the hood is replaced. Consequently it will be seen that when the hood is replaced on the reservoir and the apertures $f$ in the collar C are partly registered with the apertures $c$ in the reservoir air will pass up space $h$ and into the reservoir and by exerting pressure upon the water will positively force the same out of the reservoir into space $b$. The entry of air into the lower end of the hood will continue until the water in space $b$ reaches the lower end of the hood, and the passage of water from the reservoir into said space $b$ will continue until the water-level reaches a height of about one-eighth of an inch above the lower end of the hood by reason of the elasticity of the air trapped in the hood. Consequently it will be seen that the space $b$ will not be refilled gradually as the water is removed therefrom by the poultry, but at intervals following the removal of the water above the lower end of the hood. Air being prevented from entering the reservoir except at the intervals stated, it follows that the water will be preserved in a wholesome state for an indefinite period of time.

The operation of the device when used to supply feed of a fluid nature is the same as when used to supply water, with the exception that after the reservoir is filled and the hood placed over the same the collar C is turned so as to make its apertures $f$ coincident with the apertures $c$ of the reservoir, and thereby afford a sufficiently free escape for the food of a fluid nature.

It will be appreciated from the foregoing that my improved device as thus far described is simple in construction, convenient to handle, and very easy to clean when necessary, and that in virtue of its peculiar construction it is adapted to preserve the water or the feed in a pure state for an indefinite length of time.

In warm weather the device is used as described, the pan A being placed on the ground or upon any suitable support. In cold weather, however, when the water or feed is liable to freeze, the pan A is placed upon the base E, which contains a lamp F, and is provided in its side wall with apertures $j$ for the admission and escape of the air necessary to support combustion. The lamp F comprises an oil-tank $k$, which has an upwardly-directed marginal flange $l$ and a filling-aperture $m$, normally closed by the cap $n$, having an aperture $p$, adapted to serve as a gas-vent; a burner $q$, which may be of any suitable construction; a flue $r$, which surrounds the burner and has its upper end apertured and arranged to impinge against the bottom of the pan A; a reservoir $s$, which rests on the top of the oil-tank and has an aperture adjacent to its lower end for the escape of water, and a hood $u$, arranged over the reservoir. The said reservoir $s$ and hood $u$ are similar to and operate in the same manner as the reservoir B and hood D, before described, their purpose being to maintain a certain depth of water on top the tank $k$, so as to prevent heating of said tank, and thereby remove the liability of the lamp exploding or the oil in the tank $k$ becoming ignited, which is an important desideratum. The reservoir $s$ is filled with water in the same manner as the reservoir B, its aperture being of course stopped with the finger or other suitable means incident to the filling operation. It is obvious that in practice the lamp F will be of such a size as to prevent freezing of the water without unduly heating the same. It is also obvious that the lamp may be used for domestic purposes— i. e., heating coffee, tea, and the like. When so used, it will be observed that the reservoir $s$ and flue $r$ will afford ample support for the vessel containing the substance to be heated.

Having thus described my invention, what I claim is—

The device described for supplying poultry with water or food of a fluid nature comprising the pan, the reservoir rising from the bottom of the pan and having its upper end open and a discharge-aperture arranged in a plane below the upper edge of the side wall of the pan, and also having its upper end bent inwardly and crimped, an adjustable collar surrounding the lower portion of the reservoir and having an aperture adapted to register with that of the reservoir and also having finger-pieces the upper edges of which are disposed in a plane below the edges of the side wall of the pan, and a removable hood arranged over the reservoir and having its lower end flared and resting upon the upper edges of the finger-pieces of the collar; and also having the opposite handles $i$; said hood being of greater diameter than the reservoir, substantially as specified.

In witness whereof I have hereunto set my hand in presence of two subscribing witnesses.

WILBER R. MAGEE.

Witnesses:
  S. S. SYMONDS,
  I. N. REEDEDO.